No. 661,987. Patented Nov. 20, 1900.
J. HINKS.
STABLE.
(Application filed June 23, 1900.)
(No Model.) 2 Sheets—Sheet 1.
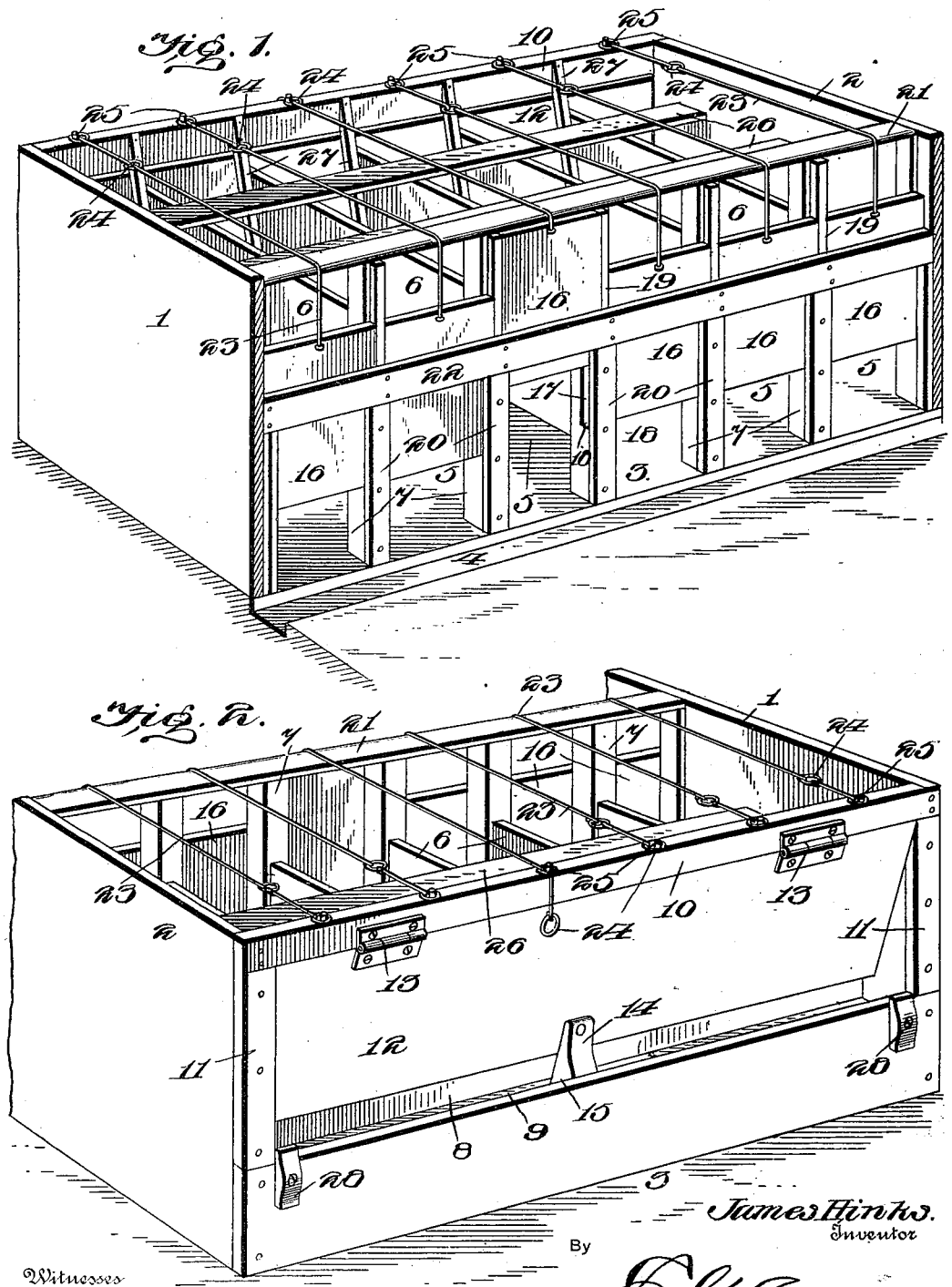

No. 661,987. Patented Nov. 20, 1900.
J. HINKS.
STABLE.
(Application filed June 23, 1900.)
(No Model.) 2 Sheets—Sheet 2.

James Hinks,
Inventor

Witnesses
Geo. H. Byrne
Louis G. Julihn

By E. G. Siggers
Attorney

UNITED STATES PATENT OFFICE.

JAMES HINKS, OF MONKTON, CANADA.

STABLE.

SPECIFICATION forming part of Letters Patent No. 661,987, dated November 20, 1900.

Application filed June 23, 1900. Serial No. 21,325. (No model.)

*To all whom it may concern:*

Be it known that I, JAMES HINKS, a subject of the Queen of Great Britain, residing at Monkton, in the Province of Ontario and Dominion of Canada, have invented a new and useful Stable, of which the following is a specification.

My present invention relates to a novel stock-stable comprehending a series of stalls and a common feed-trough.

The object of the invention is to produce a stable particularly adapted to facilitate the feeding of stock, but more especially for the stabling and feeding of pigs. During the course of a varied experience in raising pigs for market I have found that the usual method of feeding—that is to say, the herding of the swine while being fed from a feed-trough—results in a great waste of feed by its being slopped over and trampled under foot by the pigs and also results in the stronger pigs getting a disproportionate share of the feed to the great detriment of the weaker animals that are crowded away from the trough and which are not properly conditioned for market when the time arrives to dispose of the herd. In view of these considerations I have devised the stock-stable constituting my present invention, comprising a series of separated stalls having individual doors at one end and across the opposite end of which series of stalls extends a feed-trough accessible to the animals occupying the stalls and arranged to be opened or closed by the swinging of a feed-door constituting a guard to prevent the pigs from gaining access to the trough while the latter is being filled from the front.

The invention further consists in the provision of means for manipulating the doors from the front of the stable and means for facilitating the retention of the feed-door in its opened and closed positions.

The invention consists still further in certain details of construction and arrangement, all of which will more fully appear hereinafter, and which will be illustrated in the accompanying drawings and defined in the appended claims.

Figure 3:
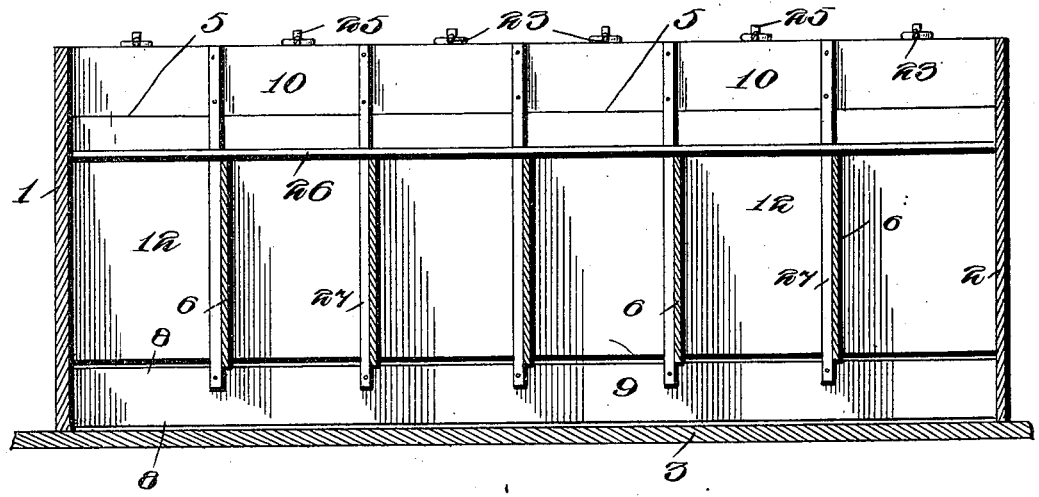
Figure 4:
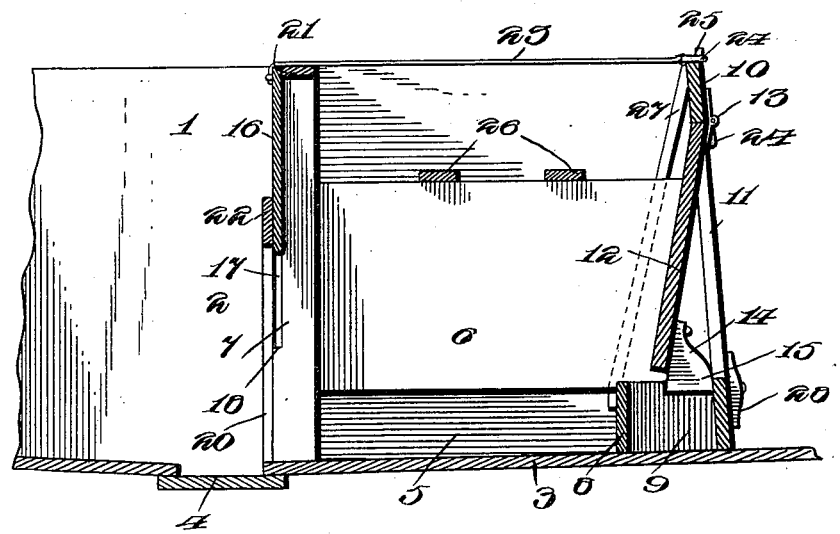

In said drawings, Figure 1 is a perspective view of a stock-stable constructed in accordance with my invention viewed from the rear side—that is to say, looking toward the entrance—one of the doors being shown in elevated position. Fig. 2 is a similar view looking from the front side of the stable, the feed-door being shown in its open position. Fig. 3 is a longitudinal sectional view of the subject-matter of the preceding figures, and Fig. 4 is a transverse sectional view.

Referring to the numerals of reference employed to designate corresponding parts in the several views, 1 and 2 indicate the side walls of the stable, which may be comprehended by the side walls of the barn or other building or which may be separate partitions if the stable is intended to be constructed within a building, but separate from the building structure.

3 indicates the floor, and 4 the usual drain-gutter formed in the floor adjacent to the entrance to the series of stalls 5, arranged in any desired manner between the side walls 1 and 2. These stalls are defined by intermediate partitions 6, arranged in parallel relation and extending from the posts or stanchions 7, located at the rear end of the stable to and slightly beyond the rear wall 8 of the feed-trough 9. The partitions 6 are secured in any suitable manner to the stanchions 7 and rest at their opposite ends upon the wall 8 of the feed-trough 9, which arrangement serves to elevate the partitions somewhat above the floor to facilitate circulation of air through the stable and to facilitate the cleaning thereof.

10 indicates the front wall of the stable, extending between the side walls 1 and 2 and preferably slightly inclined vertically to facilitate depositing of the feed into the feed-trough 9 through a doorway 11, extending the full length of the stable and closed by a swinging feed-door 12. The feed-door is hinged at its upper edge, as by hinges 13, to the front wall 10 at the upper edge of the doorway and is designed to be held in both its open and closed positions by a suitable door-retaining device, which is preferably a turn-button 14, pivoted upon the door adjacent to its lower edge to permit said button to be turned down in front of the wall 10 below the doorway for the purpose of securing the door in its closed position. In order to retain the door 12 in its open position and sufficiently near the front wall 8 of the trough to constitute a guard preventing the pigs from gaining access to the trough, the button 14 is provided with a somewhat-extended tail piece 15, which when the door is thrown to its open position, as illustrated in Fig. 4, engages the rear side of the wall 10, thus preventing the door 12 from swinging back to its closed position or from being forced back by the pigs. It may be noted in this connection that the vertical inclination of the front wall 10 of the stable facilitates the retention of the feed-door 12, since it brings the hinge of the door in a vertical plane between the positions assumed by the lower edge of the door in the opened and closed positions of the latter, and therefore causes the door to have a tendency to swing toward the wall 10 when open and from said wall when closed, thereby permitting the employment of a single door-retaining device for holding the door in either position.

The ends of the stalls opposite the feed-trough are designed to be normally closed by stall-doors 16, mounted to slide in grooves 17 in the side faces of the stanchions 7, said grooves preferably terminating a short distance above the floor 3 to form stops 18, which limit the depression of the doors when closed and retain them in position to prevent the exit of the pigs without effecting such complete closure of the ends of the stalls as will interfere with the proper circulation of air or with the cleaning of the stalls when necessary. The grooves 17 are preferably formed by cutting away the opposite sides of the stanchions at their front edges to form longitudinal tongues 19, the sides of which constitute the bottom of the recesses 17 and between which the doors 16 slide. Upon the faces of the stanchions thus recessed are fixed, as by nailing, screwing, or the like, the short slats 20, which extend from the floor 3 to a point about midway between the floor and a horizontal top rail 21, secured upon the upper ends of the stanchions and extended between the walls 1 and 2. The series of short slats 20 may be, and preferably are, surmounted by a cap-rail 22, resting upon the upper ends of the slats and secured to the outer faces of the tongues 19 and to the walls 1 and 2, respectively.

It will now be seen that the stall-doors 16 will normally gravitate to their closed positions, as illustrated more particularly in Fig. 1 of the drawings, but that they will be retained by the stops 18 at a sufficient distance above the floor 3 to permit the pigs to gain access to the stalls by raising the doors with their bodies. After the pig has gained access to a stall, however, the door will drop down to prevent the escape of the pig and to prevent interference from other pigs during the feeding of the stock.

I deem it preferable in practice to provide door-operating means which will facilitate the raising of the doors by the attendant located at the front of the stall, where his attention is required for the filling of the feed-trough. Various forms of mechanism for this purpose may be devised; but I prefer to employ a series of door-operating cables 23, connected at their rear ends to the upper edges of the stall-doors 16 and thence passed over the top rail 21 to the front of the stable, where each cable is provided with a plurality of retaining loops or rings 24, designed to be engaged by pins or other projections 25, extending upwardly from the upper edge of the wall 10 or from any other convenient part of the structure. Guard-rails 26 are preferably extended over the stalls to prevent the pigs from interfering with the door-operating cables 23 and to prevent them from rearing sufficiently to permit their weight to be thrown upon the feed-door 12 when the latter is in its open position and is serving as a guard. If desired, the front end of the partitions may be braced by inclined brace-rods 27, extending from the upper edge of the wall 8 of the feed-trough to the front wall 10 of the stable above the feed-door, and for the purpose of preventing the feed-door 12 from swinging outwardly beyond its closed position turn-buttons 28 or other door-retaining devices may be provided upon the wall 10 in position to engage the edge of the door when the latter is closed.

From the foregoing it will appear that I have produced a practical and efficient stock-stable designed to facilitate the feeding of stock in a manner to prevent the animals from interfering with each other, to economize the feed, and to insure the retention of the stock in such cleanly condition as will greatly conduce to their salability; but while the present embodiment of my invention appears to be preferable I do not wish to limit myself to the structural details defined, as, on the contrary, I reserve the right to effect such changes, modifications, and variations of both form and arrangement as may be comprehended within the scope of the protection prayed.

What I claim is—

1. A stable comprising a series of stalls, a feed-trough common to the several stalls and provided with a feed-door extending entirely across the stable, individual doors for the several stalls, the stall-doors and feed-door being located at opposite ends of the stable, and individual stall-door-operating devices for each of the several stall-doors.

2. A stable comprising a series of stalls, a feed-trough common to the several stalls and provided with a feed-door extending entirely across the stable, individual doors for the several stalls, the stall-doors and feed-door being located at opposite ends of the stable, and individual stall-door-operating devices for each of the several stall-doors, said devices being extended to the end of the stable at which the feed-door is located to permit the manipulation of the feed-door and of the individual stall-doors from the same end of the stable.

3. A stable comprising a series of stalls and having a vertically-inclined front wall, a feed-trough common to all of the stalls and located at the front end of the stable, a feed-door extending the full length of the trough and hinged at its upper edge to said wall in a vertical plane intermediate of the trough-walls, and a feed-door-retaining device arranged to engage opposite sides of the front wall to retain the door flush with said wall or in a position intermediate of the trough-walls.

4. A stable comprising a vertically-inclined front wall provided with a doorway, a feed-trough located adjacent to the bottom of the front wall and extending the full length of the stable, a series of partitions defining stalls extending from one side of the feed-trough, a stall-door hinged at its upper edge within the doorway, a door-retaining button carried by the door and provided with a tailpiece, said button being arranged to retain the door in a position flush with one wall of the trough or in a position intermediate of the walls thereof, and door-retaining devices mounted upon the wall of the trough and constituting stops for preventing the swinging of the door beyond the front wall of the stable.

In testimony that I claim the foregoing as my own I have hereto affixed my signature in the presence of two witnesses.

JAMES HINKS.

Witnesses:
W. A. TINDALL,
F. SMITH.